(12) United States Patent
Zilliacus et al.

(10) Patent No.: US 6,893,347 B1
(45) Date of Patent: May 17, 2005

(54) METHOD AND APPARATUS FOR PLAYING GAMES BETWEEN THE CLIENTS OF ENTITIES AT DIFFERENT LOCATIONS

(75) Inventors: Martin Zilliacus, Kauniainen (FI); Heikki Rautila, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/350,315

(22) Filed: Jul. 9, 1999

(51) Int. Cl.[7] .............................................. A63F 13/00
(52) U.S. Cl. ............................ 463/41; 463/43; 463/29
(58) Field of Search .............................. 463/16–20, 29, 463/40–43; 273/138.1, 139, 138.2; 700/90–93

(56) References Cited

U.S. PATENT DOCUMENTS

| | | | | |
|---|---|---|---|---|
| 5,108,115 A | * | 4/1992 | Berman et al. | 273/439 |
| 5,397,133 A | * | 3/1995 | Penzias | 273/439 |
| 5,618,045 A | * | 4/1997 | Kagan et al. | 463/40 |
| 5,738,583 A | * | 4/1998 | Comas et al. | 463/40 |
| 5,797,085 A | * | 8/1998 | Beuk et al. | 370/328 |
| 5,809,520 A | * | 9/1998 | Edwards et al. | 711/115 |
| 5,813,913 A | * | 9/1998 | Berner et al. | 463/40 |
| 5,830,069 A | * | 11/1998 | Soltesz et al. | 463/42 |
| 5,915,225 A | * | 6/1999 | Mills | 455/412 |
| 5,964,660 A | * | 10/1999 | James et al. | 463/1 |
| 5,973,475 A | * | 10/1999 | Combaluzier | 320/107 |
| 5,999,808 A | * | 12/1999 | LaDue | 455/412 |
| 6,028,866 A | * | 2/2000 | Engel et al. | 370/461 |
| 6,050,898 A | * | 4/2000 | Vange et al. | 463/42 |
| 6,080,064 A | * | 6/2000 | Pieterse et al. | 463/42 |
| 6,084,584 A | * | 7/2000 | Nahi et al. | 345/864 |
| 6,117,013 A | * | 9/2000 | Eiba | 463/41 |
| 6,169,902 B1 | * | 1/2001 | Kawamoto | 455/456 |
| 6,256,019 B1 | * | 7/2001 | Allport | 345/169 |

FOREIGN PATENT DOCUMENTS

| | | | |
|---|---|---|---|
| FR | 2775550 A1 | * | 2/1998 |
| WO | WO 93/23125 | * | 11/1993 |
| WO | WO 97/28636 | * | 8/1997 |
| WO | WO 98/47589 | * | 10/1998 |
| WO | WO 99/02003 | * | 1/1999 |

OTHER PUBLICATIONS

Jennifer Obrien, Wireless industry nibbles at Bluetooth, Computer dealer News, Dec. 21, 1998.*

* cited by examiner

*Primary Examiner*—John M. Hotaling, II (57) ABSTRACT

A method and apparatus for playing games between the clients of entities at different locations by linking multiple players together through a network using the users' mobile phones. The method includes connecting a plurality of mobile phones together through a network for playing a game, setting up a game scenario for each of the plurality of mobile phones and transmitting game signals between the plurality mobile phones across the network. At least two of the plurality of mobile phones are remotely located. The mobile phones connect to the network through a base station. A connection from a mobile phone to the network through a base station is a low power radio frequency connection. The interactive game may be interrupted when a mobile phone receives a call. The interactive game is interrupted only for the mobile phone receiving the call.

15 Claims, 7 Drawing Sheets

METHOD AND APPARATUS FOR PLAYING GAMES BETWEEN THE CLIENTS OF ENTITIES AT DIFFERENT LOCATIONS

BACKGROUND OF THE INVENTION

1. Field of the Invention

This invention relates in general to interactive games, and more particularly to a method and apparatus for playing games between the clients of entities at different locations.

2. Description of Related Art

Different operators in different countries, and also within most countries, are maintaining and administrating the communications networks. The different national and regional networks are connected to each other. The networks in different countries are connecting in order to be able to connect people who are subscribers of relevant networks by means of voice or data connections. The networks are like Plain Old Telephone Service (POTS), Public Switched Telephone Network (PSTN), Integrated Services Digital Network (ISDN), Asynchronous Digital Subscriber Lines (ADSL) or any variant of Digital Subscriber Lines (xDSL), Public Land Mobile Network (PLMN), etc. For example, ISDN subscribers can call conventionally to other subscribers. Further, ISDN subscribers can establish a connection to the Internet with a computer. The above networks provide mainly circuit switched services to the terminals of the subscribers.

Packet-switched Internet Protocol (IP) networks provide shared, virtual circuit connections between users. Bandwidth is dynamically allocated for improved utilization of network capacity. Packets are routed to the destination IP address contained within the header of each packet. Packets may travel over separate network paths before arriving at their final destination for reassembly and resequencing. The transmission speed between any two users can change dramatically based on the dynamic number of users sharing the common transmission medium, their bandwidth requirements, the capacity of the transmission medium, and the efficiency of the network routing and design.

The IP is a network layer protocol that routes data across an Internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands".

Corporate Local Area Networks (LANs) are connected through routers and links such as T1 lines to the Internet. The personal computers and laptop computers can be connected to the Internet Service Providers (ISPs) via dial up links. The ISPs each having Dynamic Host Configuration Protocol (DHCP) servers that provides users with a temporary IP address to connect to the Internet. These ISPs also have Domain Name Service (DNS) servers, which provide addresses to the users, i.e., they translate domain names into IP addresses. This provides easier recognition based on domain name versus IP addresses. DNS servers point to each other for address resolution. The residential consumer has an increasing requirement for bandwidth to the home to support access to interactive multimedia services including Internet access. The access is done, for example, by the modem connecting the home computer to the Data Information Provider or Corporate LAN over the PSTN. The data modem uses the existing phone line into the home and phone calls cannot be made while the data modem is in operation. ISDN is deployed over a separate facility and provides for two channels that can be used for data access or for telephone service.

Wireless mobile communications continues to expand at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, have a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators.

One interesting application which relies upon at least some of the above mentioned technologies is interactive gaming. Previously, this interactive gaming has been relegated to users who are hard-core computer enthusiast. For instance, online gaming required arcane skills belonging only to computer savvy users. However, online gaming has become easier for the more casual user. In fact, online gaming is rapidly becoming one of the most popular activities on the Internet.

Most important to interactive gaming enthusiast is the ability to connect with other enthusiasts who may be located at remote locations. The convergence of telecommunications and computer technology has lead to portable computers being able to connect to the Internet using wireless modems and also to cellular phones, which include computer games.

However, the mobile phone is more ubiquitous as well as more mobile than portable computers. Further, low power RF technologies are gaining greater interest, which is evidenced by the establishment of the Bluetooth Special Interest Group that is developing standards for low power wireless technologies. Still, gaming enthusiast are not able to connect to others remote locations. Moreover, even if the ability to connect with other gaming enthusiast was provided, there is still the inability to control game parameters, such as the selection and command for game groups, in a single location It can be seen that there is a need for a method and apparatus for playing games between the clients of entities at different locations.

It can also be seen that there is a need for a method and apparatus for controlling game parameters, such as selection of players in a game group.

It can also be seen that there is a need for entities to offer low cost services for their customers in order to attract people to their locations.

It can also be seen that there is a need with mobile phone clients to utilize low cost connections between the mobile phone users.

SUMMARY OF THE INVENTION

To overcome the limitations in the prior art described above, and to overcome other limitations that will become apparent upon reading and understanding the present specification, the present invention discloses a method and apparatus for playing games between the clients of entities at different locations.

The present invention solves the above-described problems by linking multiple players together through a network using the users' mobile phones.

A method in accordance with the principles of the present invention includes connecting a plurality of mobile phones together through a network using a transceiver for playing a game, setting up a game scenario for each of the plurality of mobile phones and transmitting game signals between the plurality mobile phones across the network.

Other embodiments of a method in accordance with the principles of the invention may include alternative or optional additional aspects. One such aspect of the present invention is that at least two of the plurality of mobile phones are remotely located.

Another aspect of the present invention is that the network is a local area network, wide area network, the Internet, a PLMN and/or a PSTN.

Another aspect of the present invention is that the mobile phones connect to the network through a base station.

Another aspect of the present invention is that a connection from a mobile phone to the network through a base station is a low power radio frequency connection.

Another aspect of the present invention is that the interactive game is interrupted when a mobile phone receives a call.

Another aspect of the present invention is that the interactive game is interrupted only for the mobile phone receiving the call.

Another aspect of the present invention is that the transceiver is a low power RF transceiver.

Another aspect of the present invention is that the mobile phone includes a first transceiver for cellular network connections and a second transceiver for low power RF connections.

Another aspect of the present invention is that the second transceiver provides connection to a LAN.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for playing games between clients of entities at different locations. Mobile terminals are used to link players through a network and to provide the game signaling.

Figure 1:
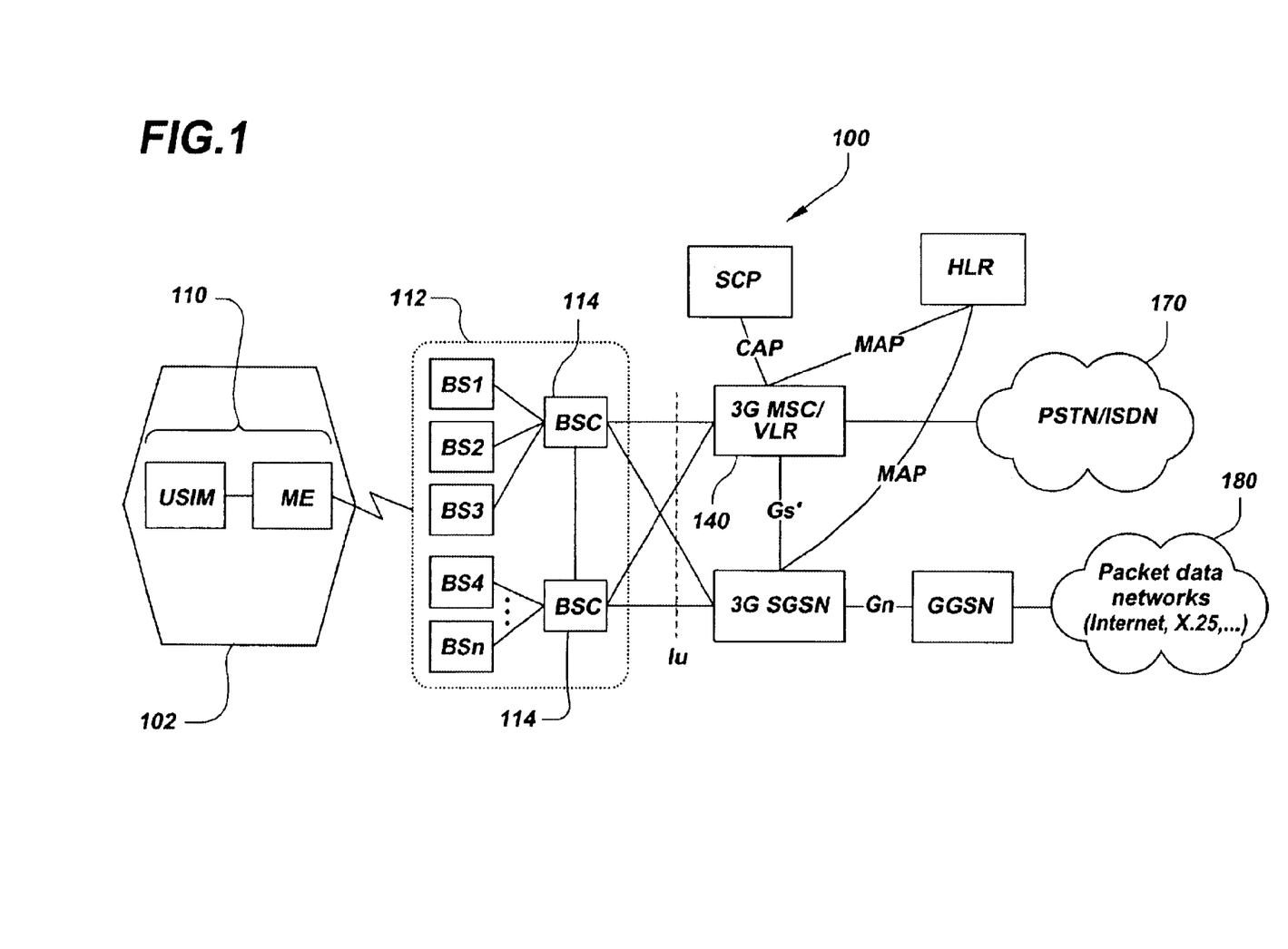
FIG. 1 illustrates one possible embodiment of an advanced communication network.

FIG. 1 illustrates a GSM network 100. Those skilled in the art will recognize that the present invention is not meant to be limited to use with GSM mobile communication systems, but is applicable to other mobile communication systems. However, the present invention will be described herein using GSM as an example.

FIG. 1 shows schematically a telecommunications network 100. The network 100 includes a number of base stations (BSs) 112. Each base station 112 has a radio transceiver (not shown) capable of transmitting radio signals to and receiving radio signals from the area of an associated cell 102. By means of these signals, the base station can communicate with the mobile station 110 which may be a mobile station in the associated cell 102. This mobile station 110 includes at least a radio transceiver for cellular networks. Each base station is connected via a base station controller (BSC) 114 to a mobile switching center (MSC) 140. The MSC 140 is linked to the PSTN 170 or to other mobile switching centers (not shown). By means of this system, a user of the mobile station 110 can establish a telephone call or corresponding connection to a destination which can be, for example, a subscriber in the PSTN 170 or another mobile station in the network 100, or even a terminal in a computer network (not shown). The connection from the MSC 140 to packet data networks, like the Internet and X.25 180, can be accomplished through the PSTN 170 or directly from the MSC 140.

Figure 2:
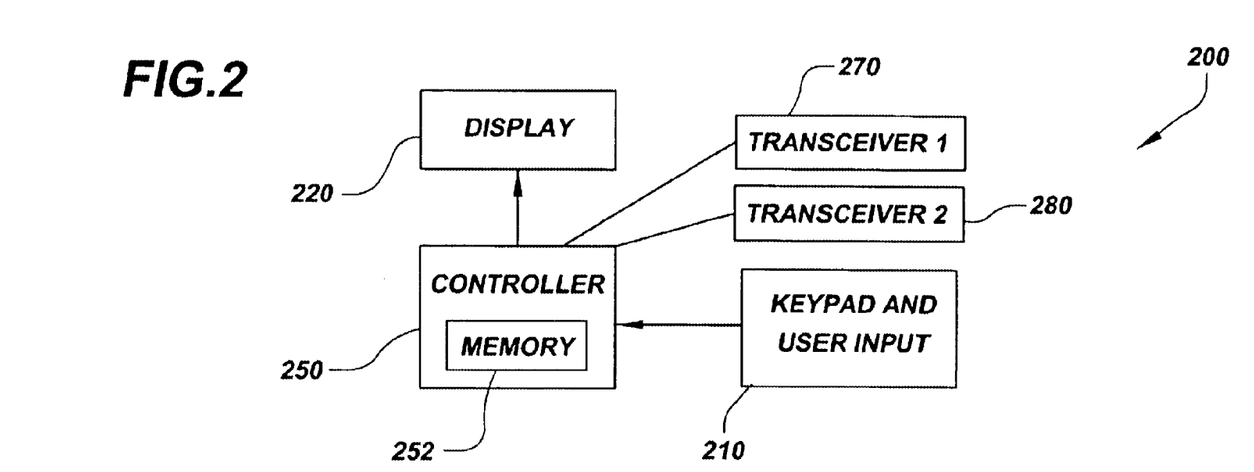
FIG. 2 illustrates a block diagram of a mobile phone.

FIG. 2 illustrates a block diagram of a mobile phone 200. The mobile phone includes a keypad 210 for dialing, for controlling menu operation and for entering phone control functions. The mobile phone also includes a display 220. The display 220 may be used to show keypad entries, such as a number to be dialed, number lookup commands, phone setup commands, etc. In addition, the display 220 may be used to display a representation of a game. For example, the phone may include games programmed therein that the user may play while not using the other functions of the phone. A controller 250 processes the user inputs and controls the display 220.

The mobile phone also includes a transceiver 270 coupled to the controller 250 for transmitting and receiving radio signals. The preferred situation is that the mobile phone 200 has a first transceiver 270 for cellular network connections and a second transceiver 280 for low power RF or local connections. The communication system provides a mechanism by which a user of the mobile phone 200 receives information of games and/or game software broadcast from a remote transceiver (not shown) which without limitation has a short (limited) range. These remote transceivers, either simultaneously or on demand, broadcast information to one or more mobile phones 200. The mobile phones 200 located within the broadcast will receive information, if desired.

The remote transceivers (not shown) broadcast information to the mobile phone 200 by means of the low power RF link. The mobile phone 200 receives the broadcast information using the transceiver 2 280 and stores the broadcast information in the memory 252 of the controller 250.

Those skilled in the art will recognize that the invention is not meant to be limited to any particular type of transceivers 270, 280. For example the transceivers 270, 280 may be a CDMA transceiver, a GSM transceiver, a TDMA transceiver, a low power RF transceiver, such as a Bluetooth transceiver module, etc. Further, the transceivers 270, 280 may have dual technology capabilities. The preferred solution, however, is to use a Bluetooth transceiver according to which has been proposed in unregulated spectrum such as 2.4 GHz as the low power RF transceiver.

Figure 3:
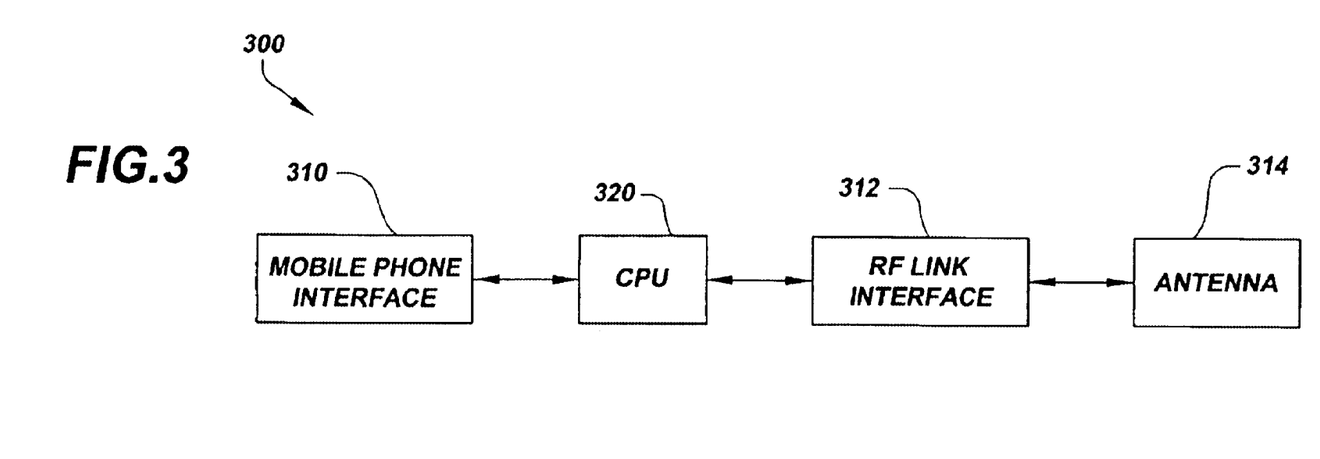
FIG. 3 illustrates a block diagram of a Bluetooth transceiver for use with a mobile phone according to the present invention.

FIG. 3 illustrates a block diagram of a Bluetooth module 300 for use with a mobile phone according to the present invention as illustrated in FIG. 2. The Bluetooth module 300 includes an interface to the mobile phone 310 and an interface to the RF link 312. An antenna 314 is provided for transmitting and receiving low power RF signals. A CPU 320 is provided for processing signals between the mobile phone interface 310 and the RF link interface 312.

Figure 4:
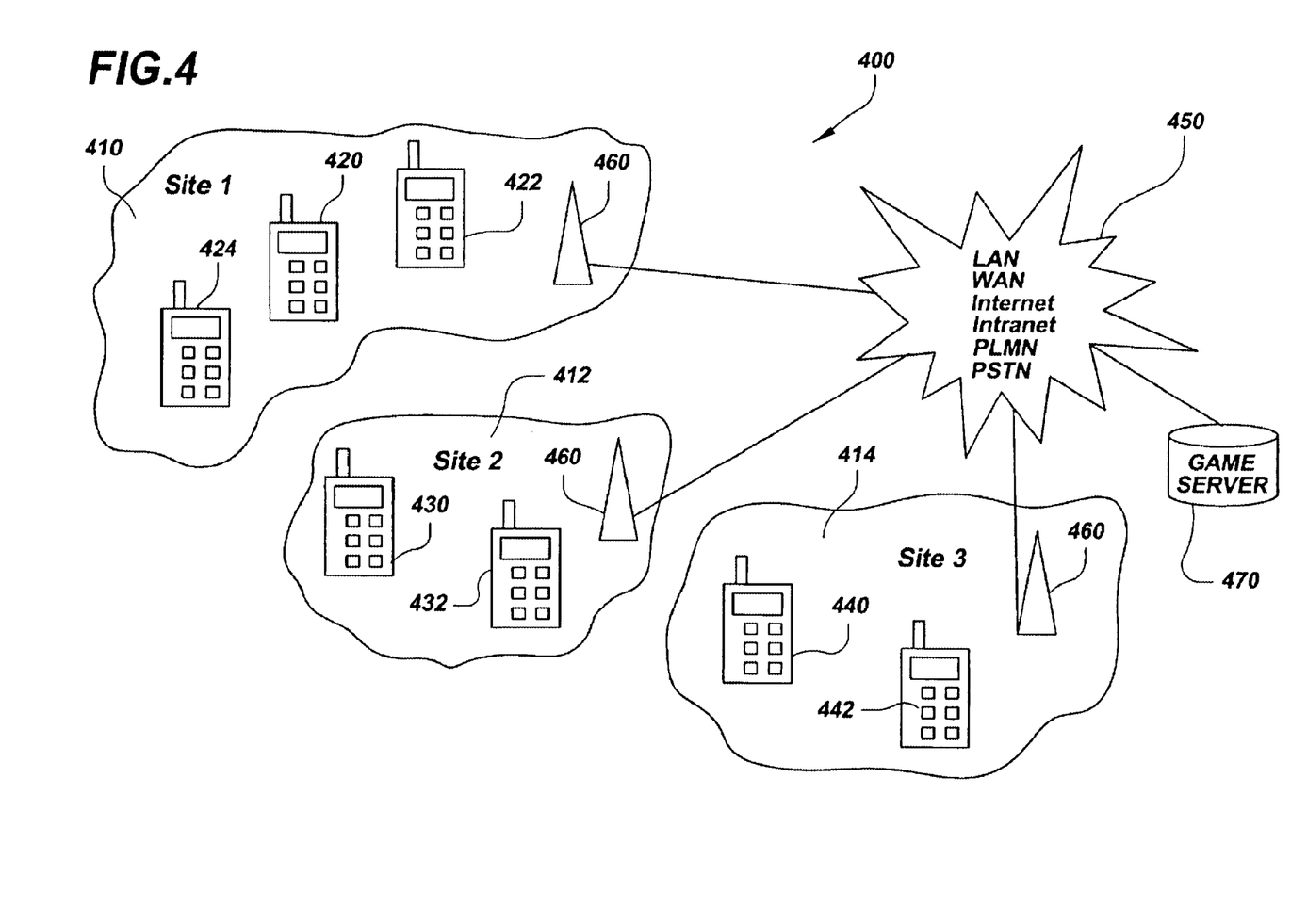
FIG. 4 illustrates an interactive game system according to the present invention, wherein a user of a mobile phone or the like may participate in an interactive game with other participants that are located at remote locations.

FIG. 4 illustrates an interactive, multiplayer game system 400 according to the present invention, wherein a user of a mobile phone or the like may participate in an interactive game with other participants that are located at remote locations. In FIG. 4, three sites 410, 412, 414 are illustrated. In site 1 410, three players, represented by mobile phones 420, 422, 424 are positioned. Similarly, two players 430/432, 440/442 are located in site 2 412 and 3 414, respectively. All of the players 420/422/424, 430/432, 440/442 are connected to a network 450. A game server 470 collects all game data which is then provided to all participants. Thus, all of the players 420/422/424, 430/432, 440/442 can play multiplayer, interactive games through the network, even though the players 420/422/424, 430/432, 440/442 are located at three different sites or locations of an entity.

The players 420/422/424, 430/432, 440/442 use the mobile phones to contact with a network, such as a LAN (Local Area Network), WAN (Wide Area Network) Internet, a public land mobile network (PLMN)or a PSTN. The sites 410, 412, 414 can even be in different cities, states or countries. In addition, mobile phones 420, 422, 424 in a single location, 410, for example may be connected via a wireless network using a low power RF transceiver. A "base station" 460 is coupled to the network 450. The "base station" 460 may be a cellular transceiver and/or a low power RF transceiver. The "base station" 460 is used for broadcasting information of entertainment/excitement within that entity 410. Further, to minimize call charges, users can use a low power RF connection to a "base station" 460 at their site if the "base station" 460 includes a low power RF transceiver. Only one transceiver for broadcasting information of entertainment/excitement within that entity is illustrated in FIG. 4, but it should be understood that there could be more than one transceiver in each site.

The broadcast information contains identification information, which provides a mobile phone with the ability to access an IP network (LAN). The identification information provides an address of entertainment/excitement available within that entity. The identification of the connection between a mobile phone, e.g. 422, and a remote transceiver, e.g., 460, is sent to the network 450 in order to identify the mobile phone 422 accessing the entertainment/excitement server 470 and when cooperating with the server 470 and with others mobile phones 420, 424, 430, 432, 440, 442 in the multiplayer system 400. The game (or entertainment/excitement) server can be within a corporate LAN.

Figure 5:
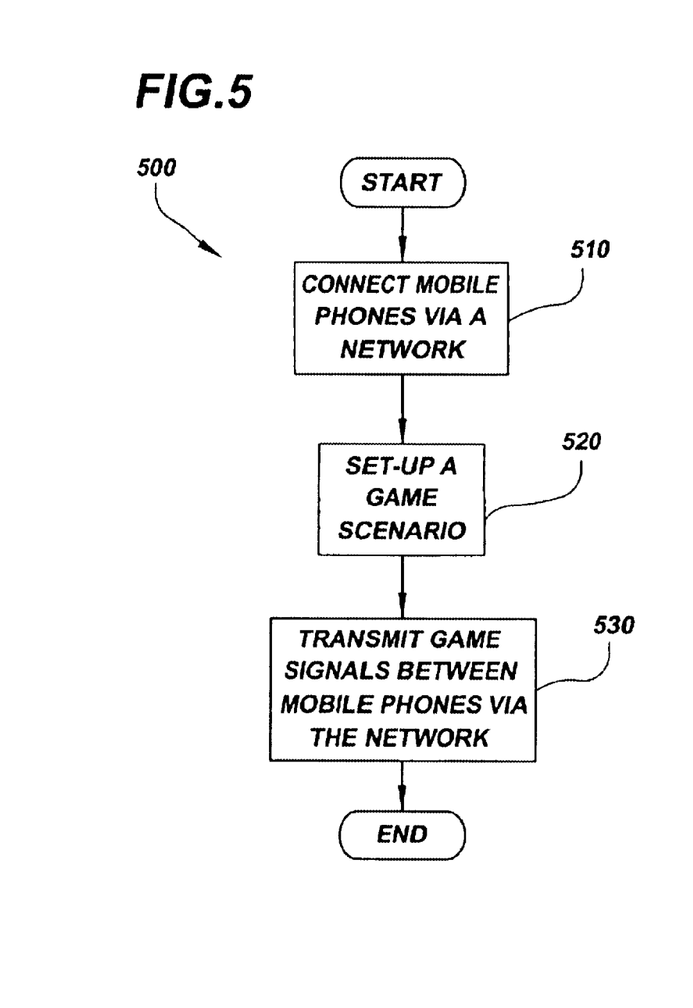
FIG. 5 is a flow chart of the method for playing games between the clients of entities at different locations.

The network 450 is connected to operators or Internet Service Providers (ISPs) to the other sites. During a game, the mobile phones 410, 412, 414 may be used for phone calls by interrupting the game. The interactive game is interrupted only for the mobile phone receiving the call FIG. 5 is a flow chart 500 of the method for playing games between the clients of entities at different locations. First, a plurality of mobile phones are connected together through a network for playing a game 510. A game scenario for each of the plurality of mobile phones is setup 520. Then, game signals are transmitted between the plurality mobile phones across the network 530.

Now referring to both FIGS. 4 and 5, it can be seen that mobile phones 420, 422 may be connected with mobile phone 430 in a first game group and mobile phones 440, 442 may be connected with mobile phone 432 and mobile phone 424 in a second game group. In this scenario, all of the mobile phones 420–442 may connect with network 450, while mobile phones 420/440 communicate with mobile phones 422/442 respectively using a low power RF network connection.

Figure 6:
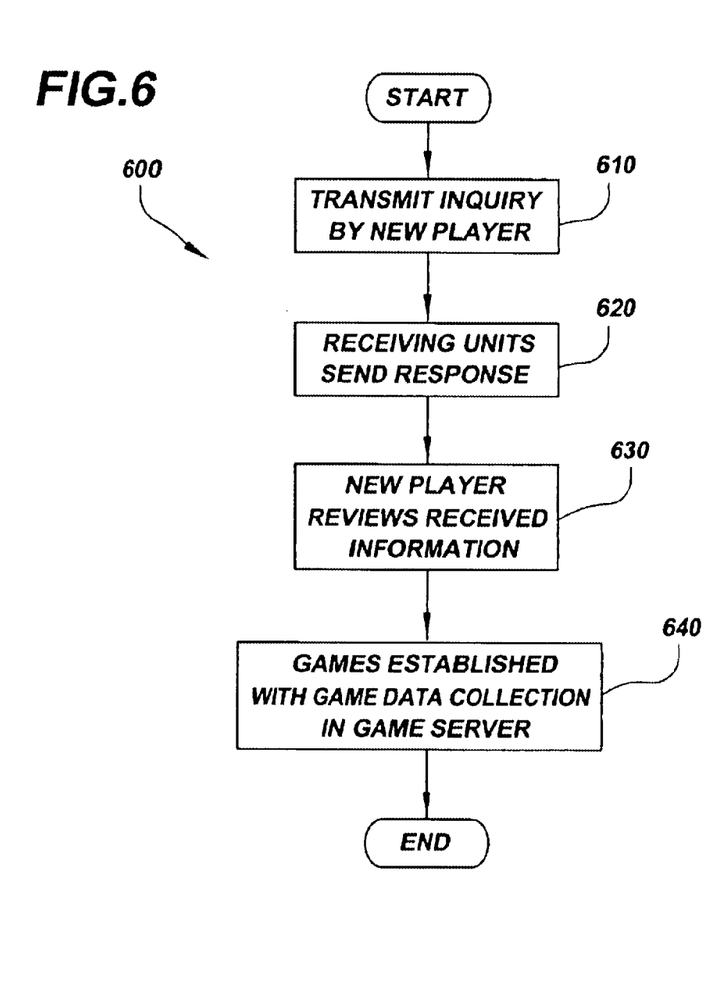
FIG. 6 is a flow chart illustrating the steps for establishing a game.

FIG. 6 is a flow chart 600 illustrating the steps for establishing a game. First an inquiry is transmitted by a new player 610. All units capturing the inquiry message may then send a response to the inquiring unit 620. The response includes information about the unit and the host. The new player may then review all of the received information 630. The new player may scroll the services available which are provided at intervals by the game server. Finally, games are established with the gaming data collection in the game server 640.

Figure 7:
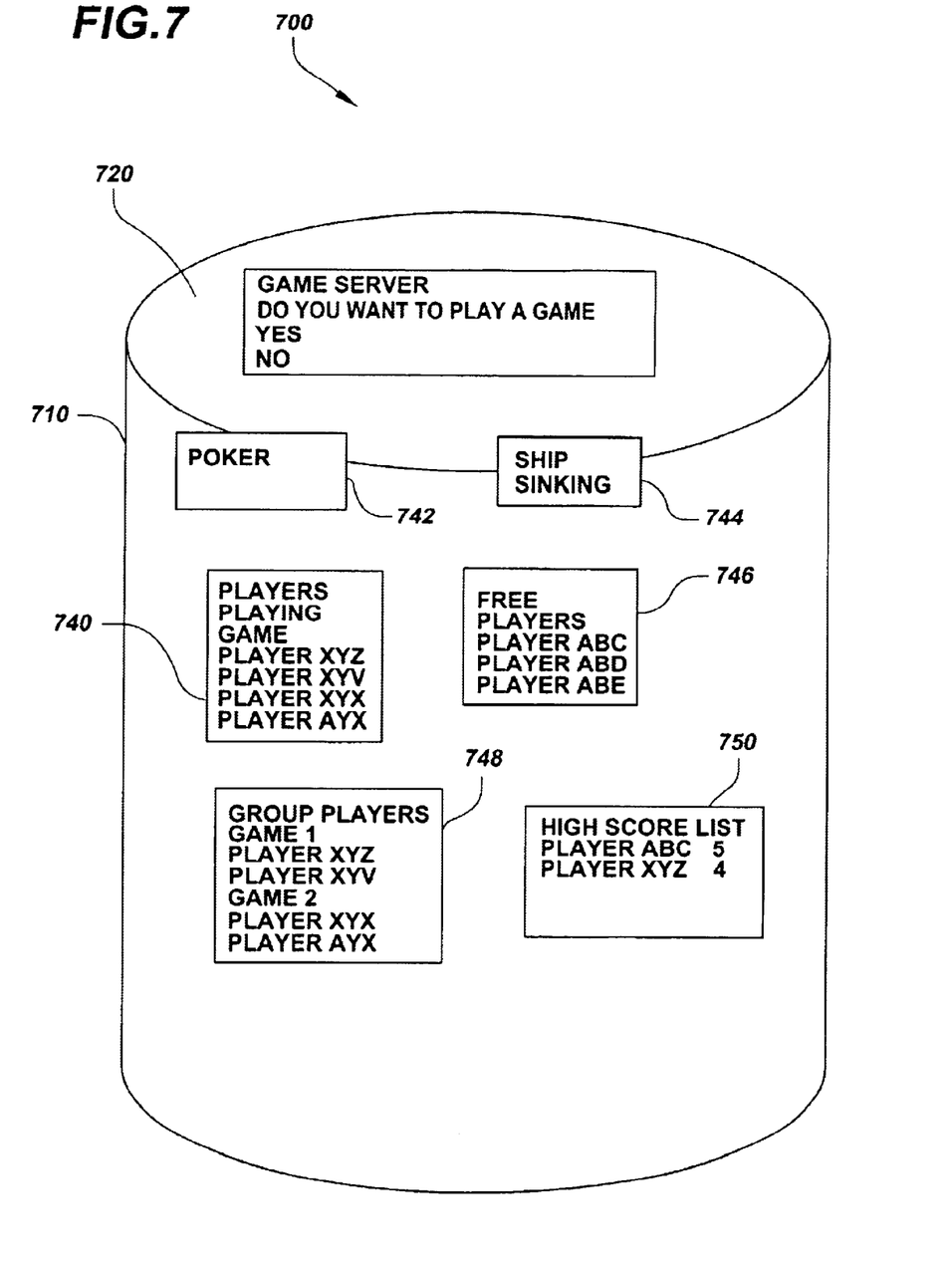
FIG. 7 illustrates a game server and associated data collections according to the present invention.

FIG. 7 illustrates a game server and associated data collections 700 according to the present invention. In FIG. 7, the game server 700 collects gaming data 710 along with input from players 720, e.g., whether a player wants to play a game. The gaming data includes the players playing a game 740, the two games being offered 742, 744, the identification of free players 746, the grouping of players into games 748 and the high score list 750.

FIGS. 8a–j illustrate the playing a game of multiplayer poker between the clients of entities at different locations according to the present invention. Regardless of how the coupling of the game groups is performed, one of the players must act as a game master for the others, without knowledge of it or at least without being informed of it. For example, when a server is involved, the server acts as the game master.

The master will form connections between the players and the commands and happenings are found in the right places. The master needs to store the name of the current game, identification and addresses of all players in the current game, any game related information needed by the players (constantly) and game state information for all players participating. Each of the players need to store the name of the current game, identification of the game master and game state information last retrieved from the master.

With regard to joining the game, player 1 first enters the location. At this point, player 1 if willing to start a game connects with the game server and remains in connection with the server to continuously receive information regarding players who are free to play the game. When player 2 is willing to start the game, player 1 can select player 2 from the list of free players. After all the players joining the game have accepted to join the game, the game begins. However, the players may also select to reject the game so that they do not attend the game. The players can get information of the players names, location and other necessary information which might be found interesting and if accepted by the respective player.

Figure 8A:
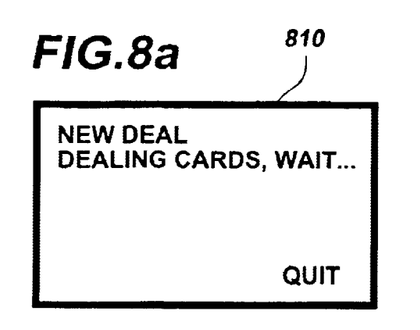
FIGS. 8a–j illustrate the playing a game of multiplayer poker between the clients of entities at different locations according to the present invention.
Figure 8B:
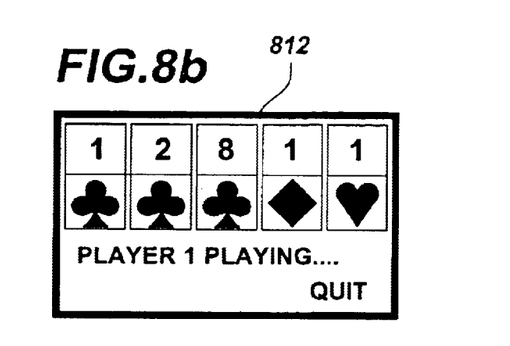
Figure 8C:
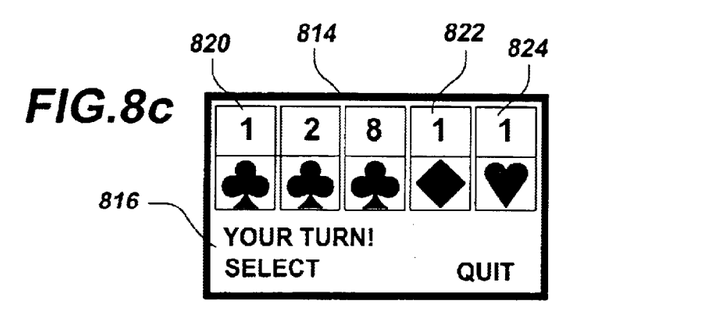
Figure 8D:
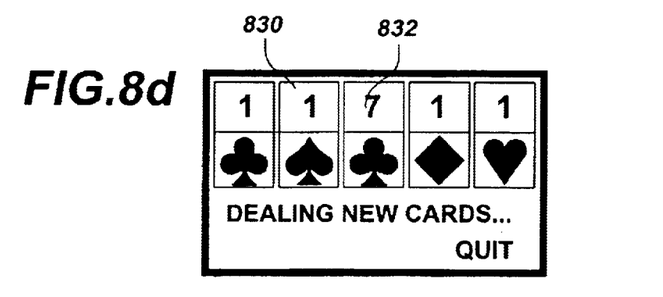

When poker is the game selected, the cards are shuffled and dealt after acceptance by a group of players, e.g., three players in the present example. FIG. 8a shows the screen 810 indicating the shuffling and dealing of the cards. Player 1 gets five cards face side up 812 as shown in FIG. 8b. Player 2 is dealt five cards 814 as shown in FIG. 8c. FIG. 8c indicates that it is the turn of player 2 816. Player 2 selects to keep cards 1 820, 4 822 and 5 824. FIG. 8d illustrates the dealing of new cards 2 830 and 3 832.

By this time, the statistics of the first results have been provided to the server. The next step is an option to open wagering. If the players have entered an agreement with the entity, and the government allows gambling, the wagering can begin. Alternatively, the playing is ended by this event. However, the players can, for example, pay some fixed sum to the game entity and inform it that they are interested in betting. Then, for example, the mobile phone user's information, such as age, etc., is controlled by the register of the mobile phone users or other means. After careful inspection, the accepted players can begin betting games and, usually, only bet with a predetermined sum, which is kept low to avoid malpractice. Whether the player's bet is accepted or not depends on the available salvo of the respective player or for some other reason(s) and is controlled in the server side. It is usually only those players who pay in advance that may wager. It is possible to pay the sums via the entity's cashier which has the connection to the game server close to the start of the game, or it can be paid well in advance. The mobile phone identification is sent to the server for checking the allowance of the user to spend the amount of the wager. Naturally only a limited amount of money is possible to load to the server.

Figure 8E:
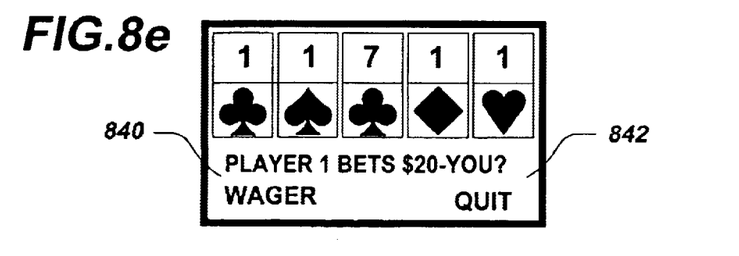
Figure 8F:
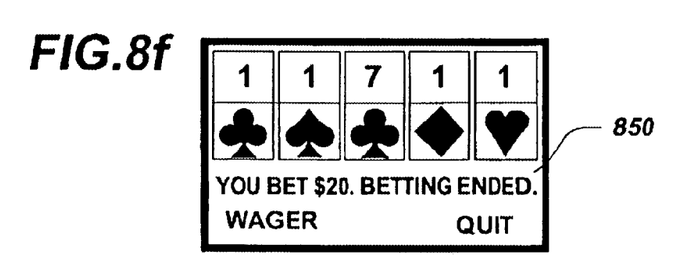
Figure 8G:
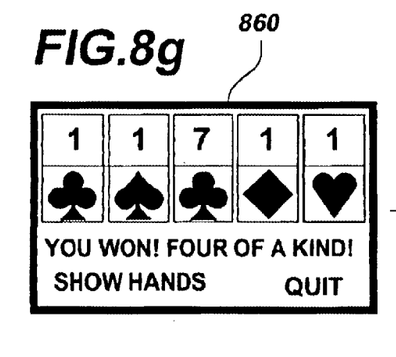
Figure 8H:
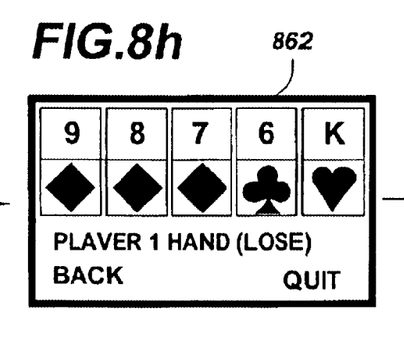
Figure 8I:
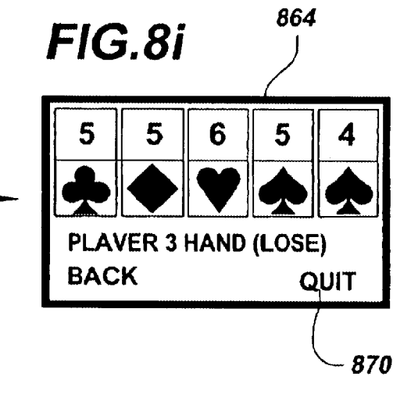
Figure 8J:
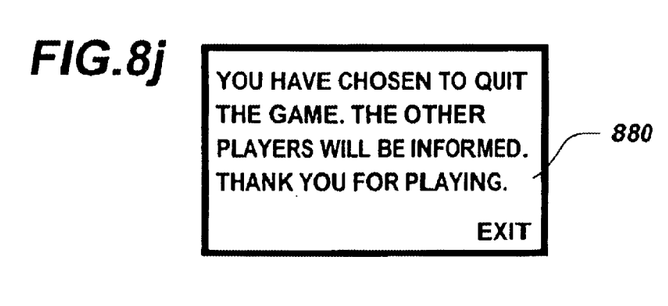

FIG. 8e illustrates the wager by player 1 840 and inquires as to other wagers 842. From the wager menu, a player can select options such as wager minimum, raise by X amount, fold, etc. FIG. 8f illustrates the betting has ended 850. If a player wagered the minimum, the hands will be shown to each player. The hand of player 2 860 is illustrated in FIG. 8g having won with four of a kind. FIG. 8h illustrates the hand of player 1 862 and FIG. 8i illustrates the hand of player 3 864. If a player desires to quit in the middle of a game, the player selects "Quit" 870 from the menu. FIG. 8j illustrates the screen after a player has selected "Quit" from the menu 880.

In summary, when a player comes to a location, such as a restaurant, the player may use a mobile phone to send an inquiry message or to answer the message sent from the base station. The mobile phone may include a low power RF transceiver module, such as a Bluetooth module. In addition, additional low power RF transceiver modules may be geographically dispersed around the location so that all interest gamers may access a game server. The new player may select the low power RF mode separately, or the new player can automatically observe low power RF information. The units that capture the inquiry message from the new player may send a response to the new player. The response contains information about the sending unit and the host. The new player receives the information and identifies which mode is available. The services available from the game server (which are transmitted at intervals) may be scrolled using the mobile phone. The new player then selects the game service: play a game, decline game, wait, etc.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A multiplayer game system, comprising:
a plurality of non-cellular transceiver modules interconnected through a communication network, the non-cellular transceiver modules including a wireless transceiver used for localized gaming transactions;
a plurality of mobile devices coupled to the plurality of non-cellular transceiver modules, wherein a first group of mobile devices is in local proximity to the wireless transceiver of a first non-cellular transceiver module and a second group of mobile devices is in local proximity to the wireless transceiver of a second non-cellular transceiver module, the first and second groups of mobile devices being outside of local proximity to each other, wherein the first and second groups of mobile devices includes:
a first transceiver coupled to a cellular network to conduct cellular communications; and
a second transceiver to bypass the cellular network and coupled to facilitate gaming activities with the proximately located wireless transceiver; and
wherein at least one of the first group of mobile devices engages in a multiplayer game with at least one of the second group of mobile devices via the interconnected non-cellular transceiver modules.

2. The multiplayer game system according to claim 1, wherein the communication network includes one of a Local Area Network (LAN), a Wide Area Network (WAN), Internet, Intranet, Public Land Mobile Network (PLMN), and Public Switched Telephone Network (PSTN).

3. The multiplayer game system according to claim 1, wherein the second transceiver includes a low power radio frequency transceiver.

4. The multiplayer game system according to claim 3, wherein the low power radio frequency transceiver includes a Bluetooth transceiver.

5. The multiplayer game system according to claim 1, wherein the wireless transceiver includes a low power radio frequency transceiver.

6. A mobile terminal coupled to a multiplayer game system, the multiplayer game system having first and second non-cellular transceiver stations interconnected via a communication network and wirelessly coupled to first and second groups of mobile terminals respectively, the first and second groups of mobile terminals being outside proximity range of one another, the mobile terminal comprising:
a first transceiver coupled to a cellular network to conduct cellular communications; and
a second transceiver to bypass the cellular network and coupled to facilitate gaming activity with the first non-cellular transceiver station, the mobile terminal engaging in a multiplayer game with ones of the first and second groups of mobile terminals through the interconnected first and second non-cellular transceiver stations.

7. The mobile terminal of claim 6, wherein the second transceiver includes a low power radio frequency transceiver.

8. The mobile terminal of claim 7, wherein the low power radio frequency transceiver includes a Bluetooth transceiver.

9. The mobile terminal of claim 6, further comprising a display coupled to provide gaming activity information relating to the ones of the first and second groups of mobile terminals.

10. A method of facilitating gaming activity between spatially separate groups of mobile terminals, the method comprising:

establishing a first non-cellular connection between a first group of mobile terminals and a first transceiver station via a non-cellular transceiver located within each mobile terminal of the first group of mobile terminals;

establishing a second non-cellular connection between a second group of mobile terminals and a second transceiver station via a non-cellular transceiver located within each mobile terminal of the second group of mobile terminals;

facilitating communication between the first and second transceiver stations via a non-cellular communication network to establish the gaming activity between at least one of the mobile terminals of the first group of mobile terminals and at least one of the mobile terminals of the second group of mobile terminals; and wherein a cellular transceiver of each mobile terminal facilitates communication via a cellular network and the non-cellular transceiver of each mobile terminal bypasses the cellular network to facilitate the gaming activity between its associated transceiver station and at least one of the mobile terminals of the first and second groups of mobile terminals.

11. The method according to claim 10, wherein establishing the first and second non-cellular connections includes using a low power radio frequency connection.

12. The method according to claim 11, wherein using the low power radio frequency connection includes using a Bluetooth connection.

13. The method according to claim 10, further comprising providing gaming information to the ones of the first and second groups of mobile terminals, wherein the gaming information includes a list of mobile terminals participating in the gaming activity and first and second group identification.

14. The method according to claim 10, further comprising receiving a call via the cellular network at one or more of the mobile terminals, wherein the gaming activity is interrupted for the one or more mobile terminals without interrupting the gaming activity for other ones of the mobile terminals in their respective groups.

15. A multiplayer game system, comprising:

a plurality of low power radio frequency (LPRF) transceiver modules interconnected through a communication network, each LPRF transceiver module including a respective LPRF transceiver used for localized gaming transactions;

a plurality of mobile devices coupled to the plurality of LPRF transceiver modules, wherein a first group of mobile devices is in local proximity to the LPRF transceiver of a first of the LPRF transceiver modules and a second group of mobile devices is in local proximity to the LPRF transceiver of a second of the LPRF transceiver modules, the first and second groups of mobile devices being outside of a proximity range of each other, wherein the mobile devices of the first and second groups of mobile devices include:

a first transceiver coupled to a cellular network to conduct cellular communications; and a second transceiver to bypass the cellular network and coupled to facilitate gaming activities with the proximately located LPRF transceiver; and wherein at least one of the first group of mobile devices engages in a multiplayer game with at least one of the second group of mobile devices via the interconnected LPRF transceiver modules.

* * * * *